United States Patent
Shi et al.

(10) Patent No.: US 11,726,252 B2
(45) Date of Patent: Aug. 15, 2023

(54) SELF-LIT DISPLAY PANEL

(71) Applicant: Meta Platforms Technologies, LLC, Menlo Park, CA (US)

(72) Inventors: Zhujun Shi, Redmond, WA (US); Keith Patterson, Kirkland, WA (US); Maxwell Parsons, Seattle, WA (US); Giuseppe Calafiore, Redmond, WA (US); Yongdan Hu, Bothell, WA (US); Zhimin Shi, Bellevue, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/741,404

(22) Filed: May 10, 2022

(65) Prior Publication Data

US 2023/0185011 A1    Jun. 15, 2023

Related U.S. Application Data

(60) Provisional application No. 63/288,920, filed on Dec. 13, 2021, provisional application No. 63/288,342, filed on Dec. 10, 2021.

(51) Int. Cl.
*G02F 1/1343* (2006.01)
*F21V 8/00* (2006.01)

(52) U.S. Cl.
CPC ......... *G02B 6/0036* (2013.01); *G02B 6/0078* (2013.01); *G02F 1/13439* (2013.01);
(Continued)

(58) Field of Classification Search
CPC .............. G02B 27/0101; G02B 27/017; G02B 2027/0118; G02B 2027/012;
(Continued)

(56) References Cited

U.S. PATENT DOCUMENTS 5,781,670 A    7/1998  Deacon et al.
9,057,926 B1   6/2015  Brown
(Continued)

FOREIGN PATENT DOCUMENTS

EP    2856244 A1    4/2015
EP    2856244 B1    1/2021

OTHER PUBLICATIONS

International Search Report and Written Opinion for International Application No. PCT/US2022/052474, dated Mar. 24, 2023, 11 pages.
(Continued)

*Primary Examiner* — Mariam Qureshi
(74) *Attorney, Agent, or Firm* — Pequignot + Myers; Matthew A. Pequignot

(57) ABSTRACT

A self-lit display panel includes a photonic integrated circuit payer including an array of waveguides and an array of out-couplers for out-coupling portions of the illuminating light through pixels of the panel. The self-lit display panel may include a transparent electronic circuitry layer backlit by the photonic integrated circuit layer; the two layers may be on a same substrate or on opposed substrates defining a cell filled with an electro-active material. The configuration allows for chief ray engineering, zonal illuminating, and separate illumination with red, green, and blue illuminating light.

16 Claims, 12 Drawing Sheets

(52) U.S. Cl.
CPC .. *G02F 1/134309* (2013.01); *G02F 2201/063* (2013.01); *G02F 2201/302* (2013.01)

(58) Field of Classification Search
CPC ...... G02B 2027/0121; G02B 2027/015; G02B 6/0078; G02B 6/0036; B60R 2300/205; G03B 21/604; G02F 2201/302; G02F 2201/063; G02F 1/13439; G02F 1/134309
See application file for complete search history.

(56) References Cited

U.S. PATENT DOCUMENTS

| | | |
|---|---|---|
| 2012/0169957 A1 | 7/2012 | Hsu et al. |
| 2015/0370073 A1 | 12/2015 | Martinez |
| 2018/0149875 A1 | 5/2018 | Gao et al. |
| 2019/0339447 A1 | 11/2019 | Shipton et al. |
| 2020/0026080 A1* | 1/2020 | Pierer ................ H01S 5/0235 |
| 2020/0096779 A1* | 3/2020 | Telfer ................ G02F 1/1677 |
| 2020/0319315 A1* | 10/2020 | Song ................ G01S 7/4818 |
| 2021/0026069 A1* | 1/2021 | Baets ................ G02B 27/0087 |
| 2022/0091459 A1 | 3/2022 | Okuyama |

OTHER PUBLICATIONS

Martinez C., et al., "See-Through Holographic Retinal Projection Display Concept," OPTICA, vol. 5, No. 10, Oct. 20, 2018, 10 pages.
International Search Report and Written Opinion for International Application No. PCT/US2022/052473, dated May 15, 2023, 17 pages.

* cited by examiner

SELF-LIT DISPLAY PANEL

REFERENCE TO RELATED APPLICATIONS

The present application claims priority from U.S. Provisional Application No. 63/288,342 filed on Dec. 10, 2021 and entitled "Backplane-Embedded Photonic Integrated Circuit", and U.S. Provisional Application No. 63/288,920 filed on Dec. 13, 2021 and entitled "Backplane-Embedded Photonic Integrated Circuit", both of which being incorporated herein by reference in their entireties.

TECHNICAL FIELD

The present disclosure relates to electro-optical devices, and in particular to visual display panels and their methods of manufacturing.

BACKGROUND

Visual displays provide information to viewer(s) including still images, video, data, etc. Visual displays have applications in diverse fields including entertainment, education, engineering, science, professional training, advertising, to name just a few examples. Some visual displays such as TV sets display images to several users, and some visual display systems such s near-eye displays (NEDs) are intended for individual users.

An artificial reality system generally includes an NED, e.g. a headset or a pair of glasses, configured to present content to a user. The near-eye display may display virtual objects or combine images of real objects with virtual objects, as in virtual reality (VR), augmented reality (AR), or mixed reality (MR) applications. For example, in an AR system, a user may view images of virtual objects (e.g. computer-generated images or CGIs) superimposed with the surrounding environment by seeing through a "combiner" component. The combiner of a wearable display is typically transparent to external light but includes some light routing optic to direct the display light into the user's field of view.

Because a display of HMD or NED is usually worn on the head of a user, a large, bulky, unbalanced, and heavy display device with a heavy battery would be cumbersome and uncomfortable for the user to wear. Consequently, head-mounted display devices can benefit from a compact and efficient configuration, including efficient light sources and illuminators providing illumination of a display panel, high-throughput collimators and other optical elements in the image forming train.

BRIEF DESCRIPTION OF THE DRAWINGS

Exemplary embodiments will now be described in conjunction with the drawings, in which.

DETAILED DESCRIPTION

Figure 1A:
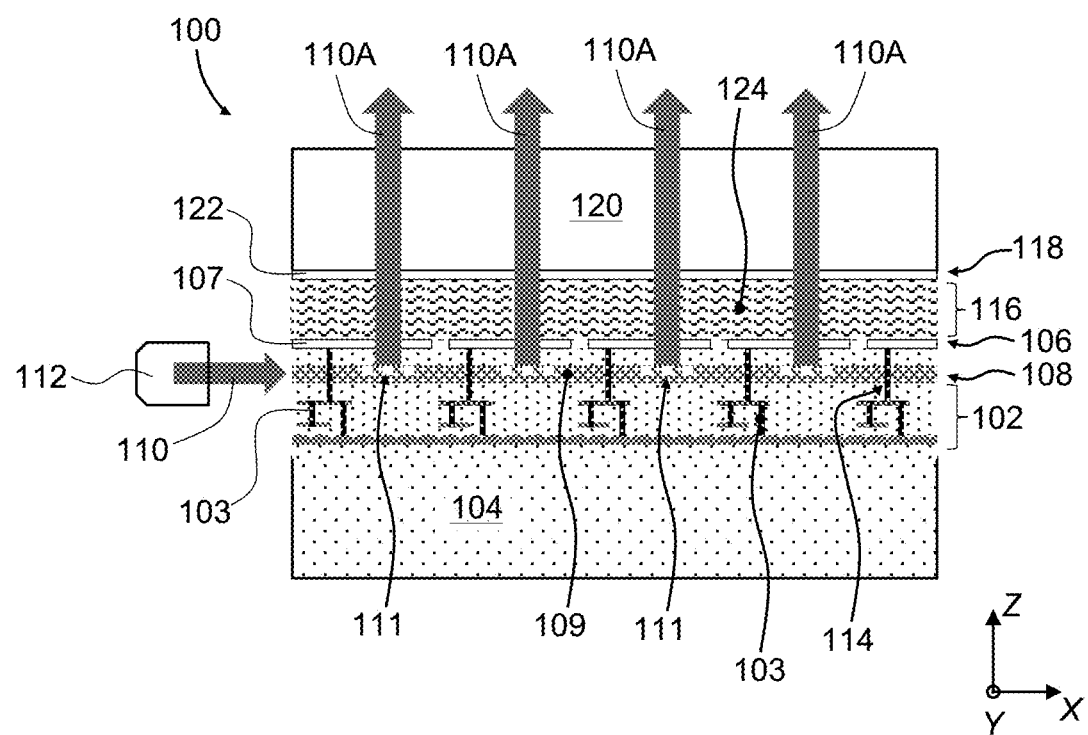
FIG. 1A is a side cross-sectional view of a self-lit display panel including a photonic integrated circuit layer formed over an electronic circuitry layer on a silicon substrate.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1A, 1B, and FIGS. 2-4, similar number refer to similar elements.

Resolution, power consumption, and form factor are important performance factors in AR displays. MicroLED displays (ILED) have an advantage of high brightness, although efficiency of such displays quickly goes down with pixel size reduction. Furthermore, due to the different materials required for red and blue/green LEDs, it may be challenging to achieve a single panel full-color µLED display. As a result, three separate µLED projectors for color display applications may need to be used, which results in tripling of the light engine size and weight. Another approach is to use a 2D scanned light beam produced by lasers or superluminescent light-emitting diodes (SLEDs)

impinging onto a microelectromechanical system (MEMS) scanning reflector. However, driver and graphics processing controller are quite complicated and energy consuming, and overall achievable resolution may be limited by a scanning mirror size.

Miniature display panels based on nematic or ferroelectric liquid crystals on silicon (LCoS and FLCoS respectively) provide an alternative solution for a light engine usable in near-eye displays such as virtual reality or augmented reality displays. With the advancement of novel ferroelectric liquid crystal materials, pixel sizes smaller than 1.5 um (down to 350 nm) become possible. However, unlike emissive displays, (F)LCoS displays require additional illumination optics such as polarization beam splitters, which add size and weight to the system.

The latter limitation of (F)LCoS display panels may be overcome by integrating the illumination circuitry directly onto the (F)LCoS substrate. A photonic integrated circuit (PIC) layer may be provided on the integrated circuitry layer of a complementary metal oxide semiconductor (CMOS) chip, providing a self-lit display panel. Furthermore, the PLC technology may be adapted to provide a so-called chief ray engineering capability. The PLC technology may be used to direct chief rays of light beams emitted by each pixel towards a common collimating element, resulting in a significant reduction of overall size and/or vignetting losses, and an increase of overall wall plug efficiency of the display apparatus. Furthermore, the PIC technology can provide features such as zonal illumination of the display panel for higher perceived contrast and power savings. Yes furthermore, CMOS technology may be adapted to provide circuitry with substantially transparent pixel areas, providing a greater variety of CMOS PLC illumination configurations and opening a path to transparent or translucent self-lit displays.

In accordance with the present disclosure, there is provided a self-lit display panel comprising a first substrate, a photonic integrated circuit (PIC) layer supported by the first substrate, the PIC layer comprising an array of waveguides for guiding illuminating light, an electronic circuitry layer supported by the PIC layer, and a pixelated electrode layer comprising an array of pixel electrodes. The electronic circuitry layer is configured for applying electrical signals to the array of pixel electrodes. The PIC layer comprises an array of out-couplers coupled to the array of waveguides for out-coupling portions of the illuminating light through the electronic circuitry layer and through the array of pixel electrodes.

The self-lit display panel may further include a second substrate opposite the first substrate, a backplane electrode layer supported by the second substrate, the pixelated and backplane electrode layers defining a cell, and an electroactive layer in the cell. In operation, the illuminating light portions may propagate in sequence through the electronic circuitry layer, the pixel electrodes, the electroactive layer, the backplane electrode, and the second substrate. The electroactive layer may include liquid crystals.

In some embodiments, the array of out-couplers comprises gratings formed in the array of waveguides. The gratings may be slanted to provide a chief ray angle of the portions of the illuminating light spatially varying from one pixel electrode to another. In some embodiments, the array of out-couplers comprises an array of nanostructures to provide a chief ray angle of the portions of the illuminating light spatially varying from one pixel electrode to another.

In embodiments where the illuminating light comprises a plurality of color channels, each waveguide of the array of waveguides may be configured to convey each color channel of the plurality of color channels. Each out-coupler of the array of out-couplers may be configured to out-couple each color channel of the plurality of color channels at a substantially same chief ray angle. In some embodiments, the array of waveguides comprises a plurality of sub-arrays, and each sub-array may be configured to carry a particular color channel of the plurality of color channels of the illuminating light.

In accordance with the present disclosure, there is provided a self-lit display panel comprising: first and second opposed substrates; a photonic integrated circuit (PIC) layer supported by the first substrate, the PIC layer comprising an array of waveguides for guiding illuminating light; a backplane electrode layer supported by the PIC layer; an electronic circuitry layer supported by the second substrate; a pixelated electrode layer comprising an array of pixel electrodes, wherein the electronic circuitry layer is configured for applying electrical signals to the array of pixel electrodes, the pixelated and backplane electrode layers defining a cell; and an electroactive layer in the cell. The PIC layer may include an array of out-couplers coupled to the array of waveguides for out-coupling portions of the illuminating light through the backplane electrode layer, the electroactive layer, and the array of pixel electrodes. The electroactive layer may include liquid crystals.

In embodiments where the array of out-couplers comprises gratings formed in the array of waveguides, the gratings may be slanted to provide a chief ray angle of the portions of the illuminating light spatially varying from one pixel electrode to another. In some embodiments, the array of out-couplers comprises an array of nanostructures to provide a chief ray angle of the portions of the illuminating light spatially varying from one pixel electrode to another.

In embodiments where the illuminating light comprises a plurality of color channels, each waveguide of the array of waveguides may be configured to convey each color channel of the plurality of color channels. Each out-coupler of the array of out-couplers may be configured to out-couple each color channel of the plurality of color channels at a substantially same chief ray angle.

In embodiments where the array of waveguides comprises a plurality of sub-arrays, each sub-array may be configured to carry a particular color channel of the plurality of color channels of the illuminating light. Each sub-array may be coupled to a beamsplitter for illuminating a particular geometrical area of the array of pixel electrodes.

In accordance with the present disclosure, there is further provided a method of manufacturing a self-lit display panel. The method comprises forming an electronic circuitry layer on a sacrificial substrate, the electronic circuitry layer comprising a pixelated electrode layer comprising an array of pixel electrodes; bonding a first substrate to the electronic circuitry layer; removing the sacrificial substrate; providing a photonic integrated circuit (PIC) layer comprising an array of waveguides for guiding illuminating light and an array of out-couplers coupled to the array of waveguides for out-coupling portions of the illuminating light; forming a cell by providing a second substrate in a fixed-apart relationship with the first substrate, the second substrate supporting a backplane electrode layer, wherein the pixelated electrode layer faces the cell, and wherein in operation, the illuminating light portions propagate through the array of pixel electrodes; and filling the cell with an electro-active material.

The PIC layer may be formed on the first substrate and faces the cell when the cell is formed. The electronic circuitry layer may be disposed between the PIC layer and the electro-active material. The PIC layer may be formed on the second substrate to face the cell when the cell is formed.

Referring now to FIG. 1A, a self-lit display panel 100 includes an electronic circuitry layer 102 supported by a first substrate 104, for example a CMOS circuitry layer formed on a silicon substrate. The electronic circuitry layer 102 may include electronic gates 103 for independently controlling individual pixels of the display panel 100. The pixels of the display panel 100 are defined by a pixelated electrode layer 106 including an array of pixel electrodes 107.

A photonic integrated circuit (PIC) layer 108 may be formed on, disposed on, and/or supported by, the electronic circuitry layer 102. The PIC layer 108 may include an array of waveguides 109, e.g. singlemode or few-mode ridge-type waveguides running under the array of pixel electrodes 107 and configured for guiding illuminating light 110 emitted by an optional semiconductor light source 112 optically coupled to the waveguides 109. Herein, the term "few-mode waveguide" refers to waveguides supporting up to 12 lateral modes of propagation. The semiconductor light source 112 may be e.g. a superluminescent light-emitting diode, a laser diode, or an array of such diodes. The PIC layer 108 supports the pixelated electrode layer 106.

The PIC layer 108 may include an array of out-couplers 111, e.g. grating out-couplers optically coupled to the array of waveguides 109 for out-coupling portions 110A of the illuminating light 110 through the array of pixel electrodes 107, providing the display panel 100 with a self-lighting capability. Herein, the term "self-lighting" or "self-lit" means that the pixels of the display panel are illuminated from inside by an inside illuminating or light-guiding structure, as opposed to a reflective or transmissive display panel requiring an external light source shining light on the panel from outside to operate. The out-couplers 111 are registered w.r.t. the pixel electrodes 107, e.g. one out-coupler 111 may be disposed directly under one pixel electrode 107.

In the embodiment shown in FIG. 1A, the display panel 100 includes a second substrate 120 disposed opposite the first substrate 104, and a backplane electrode layer 122 supported by the second substrate 120. The pixelated 106 and backplane 118 electrode layers define a cell 116, typically a plano-parallel cell from 1 to 9 micrometers thick. An electroactive layer 124, e.g. a layer of a nematic or ferro-electric liquid crystal fluid, may fill the cell 116. The electroactive layer 124 is responsive to an electric field applied by the pixelated 106 and backplane 118 electrode layers. Herein, the term "responsive to an electric field" means that the electroactive layer 124 changes its property that influences an optical property of the portions 110A of the illuminating light 110, such as polarization state, by application of the electric field.

Figure 1B:
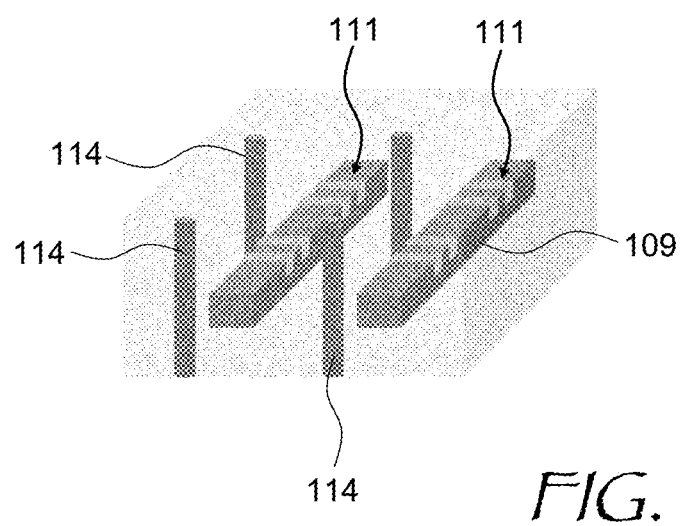
FIG. 1B is a three-dimensional partial view of the illuminating waveguides and vias region of the self-lit display panel of FIG. 1A.

The second substrate 120 is transparent to the portions 110A of the illuminating light 110. In the illustrated embodiment, the PIC layer 108 is disposed between the electronic circuitry layer 102 and the pixelated electrode layer 106, and electrically separates these two layers. To electrically couple the electronic gates 103 to the respective pixel electrodes 107, an array of electrically conductive vias 114 may be provided, allowing the gates 103 of the electronic circuitry layer to apply electrical signals to the respective pixel electrodes 107. As best seen in FIG. 1B, the array of vias 114 may extend from the electronic circuitry layer 102 through the PIC layer 108 between the waveguides 109 of the array and to the array of pixel electrodes 107 at a distance large enough to substantially not perturb the optical function of the waveguides 109 and out-couplers 111.

In operation, the illuminating light portions 110A out-coupled by the out-couplers 111 from the waveguides 109 propagate in sequence through the pixel electrodes 107, the electroactive layer 124, the backplane electrode layer 122, and the transparent second substrate 120. The optical property of the portions 110A, e.g. their polarization state, may be controlled in a spatially selective manner by applying signals to the gates 103, which are electrically coupled to the respective pixel electrodes 107 through the vias 114 to change local electric field applied to the respective portions of the electroactive layer 124. The spatially varying polarization state of the out-coupled illuminating light portions 110A may be converted into the optical power density distribution by a downstream polarizer, not shown for brevity. The optical power density distribution of the illuminating light portions 110A corresponds to an image displayed by the display panel 100.

Figure 2:
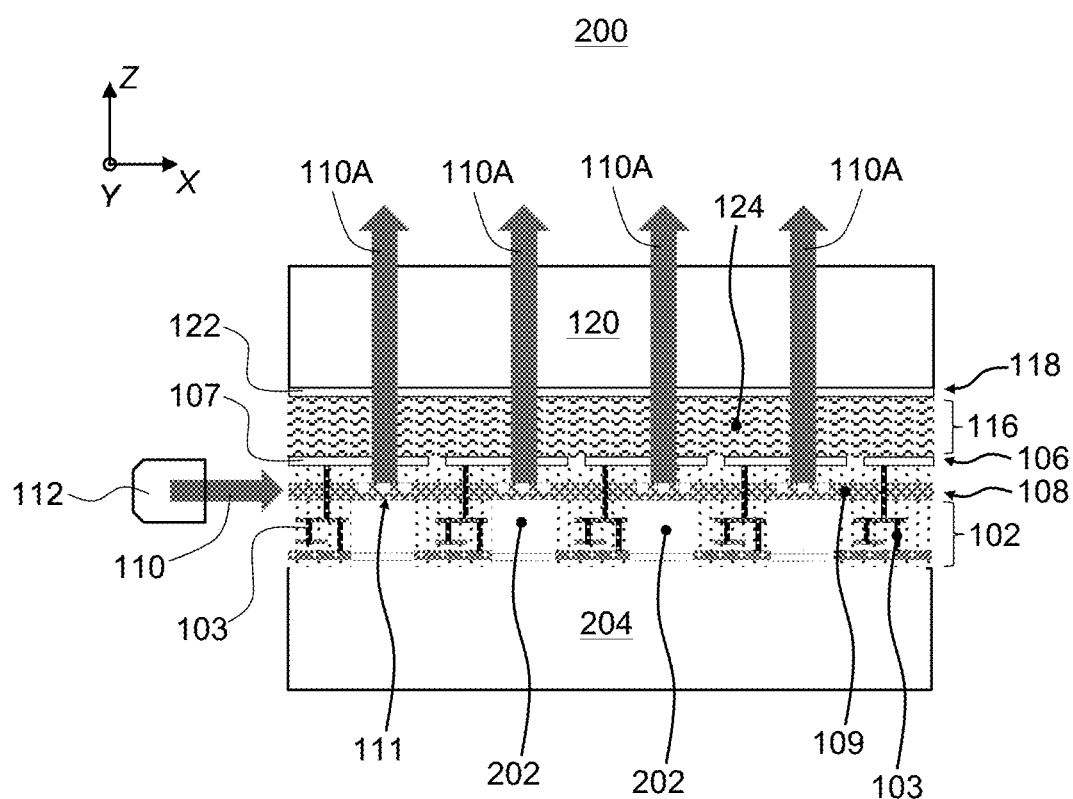
FIG. 2 is a side cross-sectional view of a self-lit display panel including a photonic integrated circuit layer supported by an electronic circuitry layer on a transparent substrate.

Referring to FIG. 2, a self-lit display panel 200 is similar to the self-lit display panel 100 of FIG. 1, and includes similar elements. The self-lit display panel 200 of FIG. 2 includes the electronic circuitry layer 102 supported by a transparent first substrate 204, e.g. glass, sapphire, crystal, etc., the PIC layer 108 on the electronic circuitry layer 102, the pixelated electrode layer 106 on the PIC layer 108 with the vias 114 electrically coupling the pixelated electrode layer 106 to the electronic circuitry layer 102 through the PIC layer 108 as described above. The cell 116 defined by the pixelated electrode 106 and the backplane 118 electrode layers is filled with the electroactive layer 124. The second substrate 120 supports the backplane electrode layer 118 including the backplane electrode 122.

Opaque substrate material may be removed in areas 202 under pixel electrodes 107 between the electronic gates 103, making the first substrate 204 with the electronic circuitry layer 102 transparent to impinging light in the areas of the pixel electrodes 107. The transparent substrate 204 and the transparent electronic circuitry layer 102 enable the self-lit display panel 200 to be used in a variety of applications such as, for example and without limitation, in augmented reality (AR) applications where the image light formed by the out-coupled portions 110A of the illuminating light 110 needs to be combined with external light from surrounding environment. A method of manufacturing the electronic circuitry layer 102 on the transparent substrate 204 will be considered further below.

Figure 3:
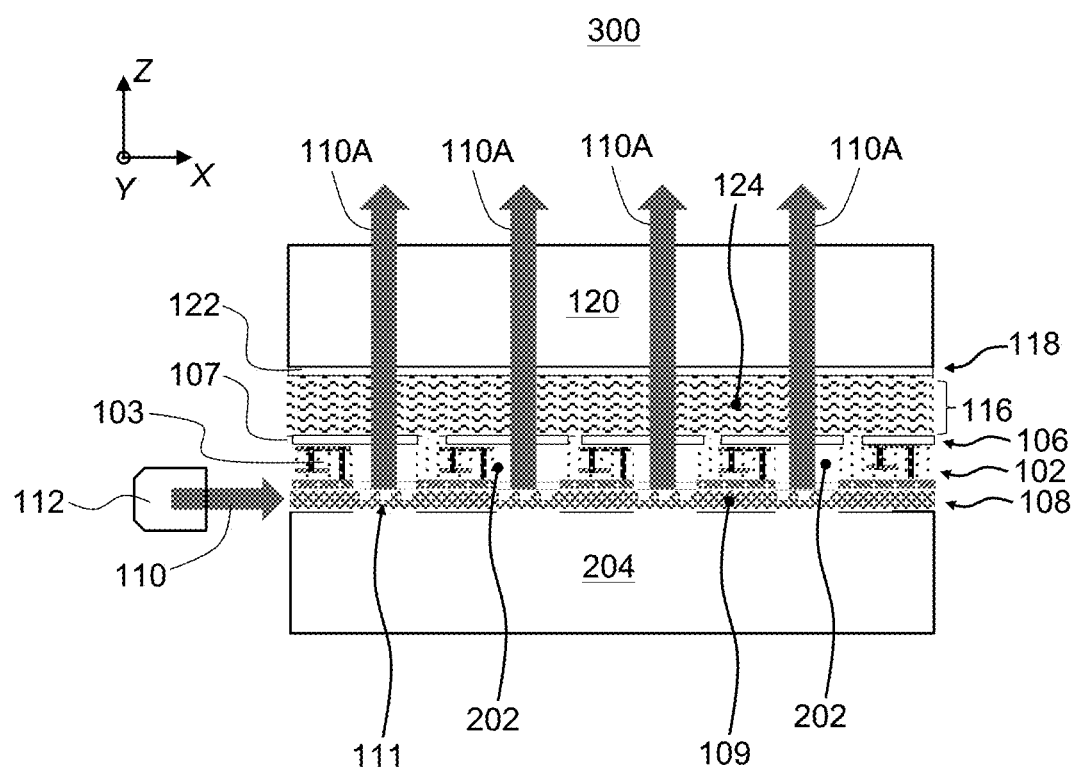
FIG. 3 is a side cross-sectional view of a self-lit display panel including an electronic circuitry layer supported by a photonic integrated circuit layer on a substrate.

Turning to FIG. 3, a self-lit display panel 300 is similar to the self-lit display panel 200 of FIG. 2, and includes similar elements. In the self-lit display panel 300 of FIG. 3, the positions of the electronic circuitry layer 102 and the PIC layer 108 in a layer stack supported by the first substrate 204 are swapped, i.e. the transparent first substrate 204 supports the PIC layer 108, which in its turn supports the electronic circuitry layer 102. Such a configuration does not need vias since the pixelated electrode layer 106 may be directly coupled to the electronic circuitry layer 102, allowing the gates 103 of the electronic circuitry layer to apply electrical signals to the respective pixel electrodes 107. The overall construction is simplified, since vias manufacturing adds many steps to the manufacturing process.

In operation, the illuminating light portions 110A out-coupled from the waveguide 109 by the array of out-couplers 111 propagate in sequence through the electronic circuitry layer 102 (specifically through the areas 202 transparent for the illumination light portions 110), the pixelated electrode layer 106, the electroactive layer 124, the backplane electrode layer 118, through the second substrate 120, and out of the self-lit display panel 300. A collimator, not shown for brevity, may receive the illuminating light portions 110A and convert an image in linear domain displayed by the self-lit display panel 300 into an image in angular domain. Herein, the term "image in angular domain" means an image where different elements of an image in linear or spatial domain, i.e. pixels of the image displayed by the display panel, are represented by angles of corresponding rays of image light, the rays carrying optical power levels and/or color composition corresponding to brightness and/or color values of the image pixels.

Figure 4:
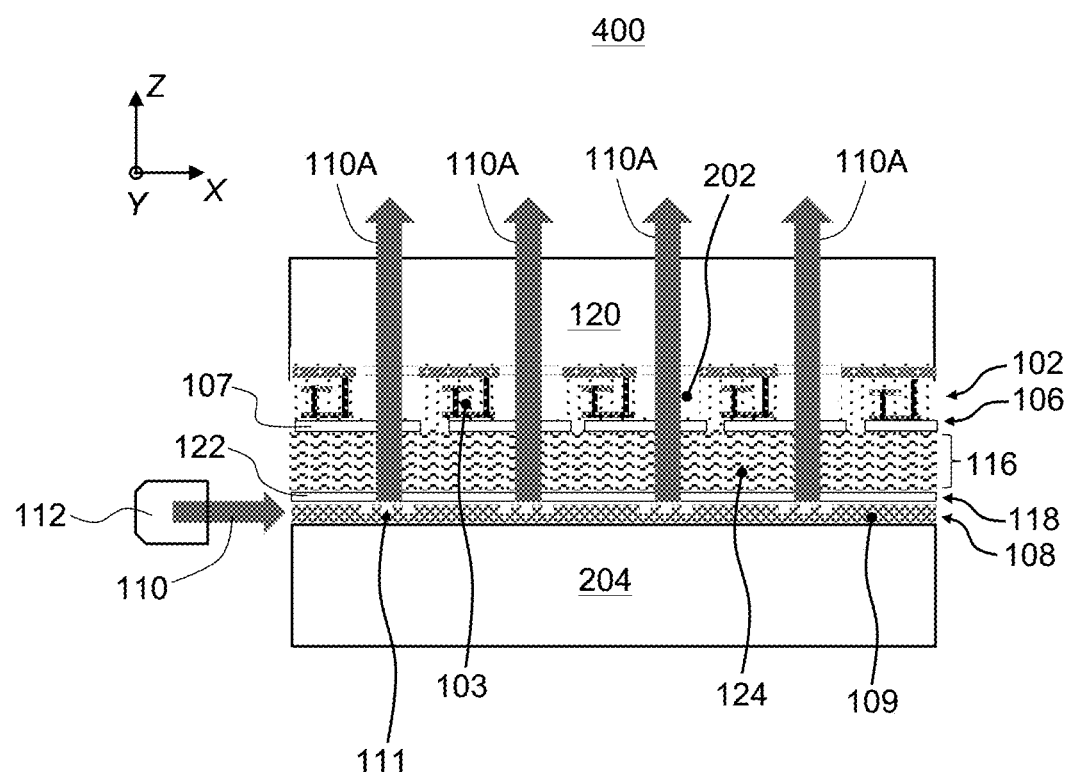
FIG. 4 is a side cross-sectional view of a self-lit display panel including photonic integrated circuit and electronic circuitry layers on opposed substrates.

Referring now to FIG. 4, a self-lit display panel 400 is similar to the self-lit display panel 300 of FIG. 3, and includes similar elements. In the self-lit display panel 400 of FIG. 4, the electronic circuitry layer 102 is moved to the other substrate; in other words, the first substrate 204 supports the PIC layer 108 supporting the backplane electrode layer 118, while the second substrate 120 supports the electronic circuitry layer 102, which supports the pixelated electrode layer 106 (shown inverted in FIG. 4). The pixelated 106 and backplane 118 electrode layers define the cell 116, with the electroactive layer 124 disposed in the cell 116, as in previous embodiments.

In operation, the illuminating light portions 110A out-coupled from the waveguide 109 by the plurality of out-couplers 111 propagate in sequence through the backplane electrode 122, the electroactive layer 124, the pixel electrodes 107, the electronic circuitry layer 102 (more specifically through the transparent areas 202), and the second transparent substrate 120, and further to collimating/image forming optics, not illustrated.

Figure 5:
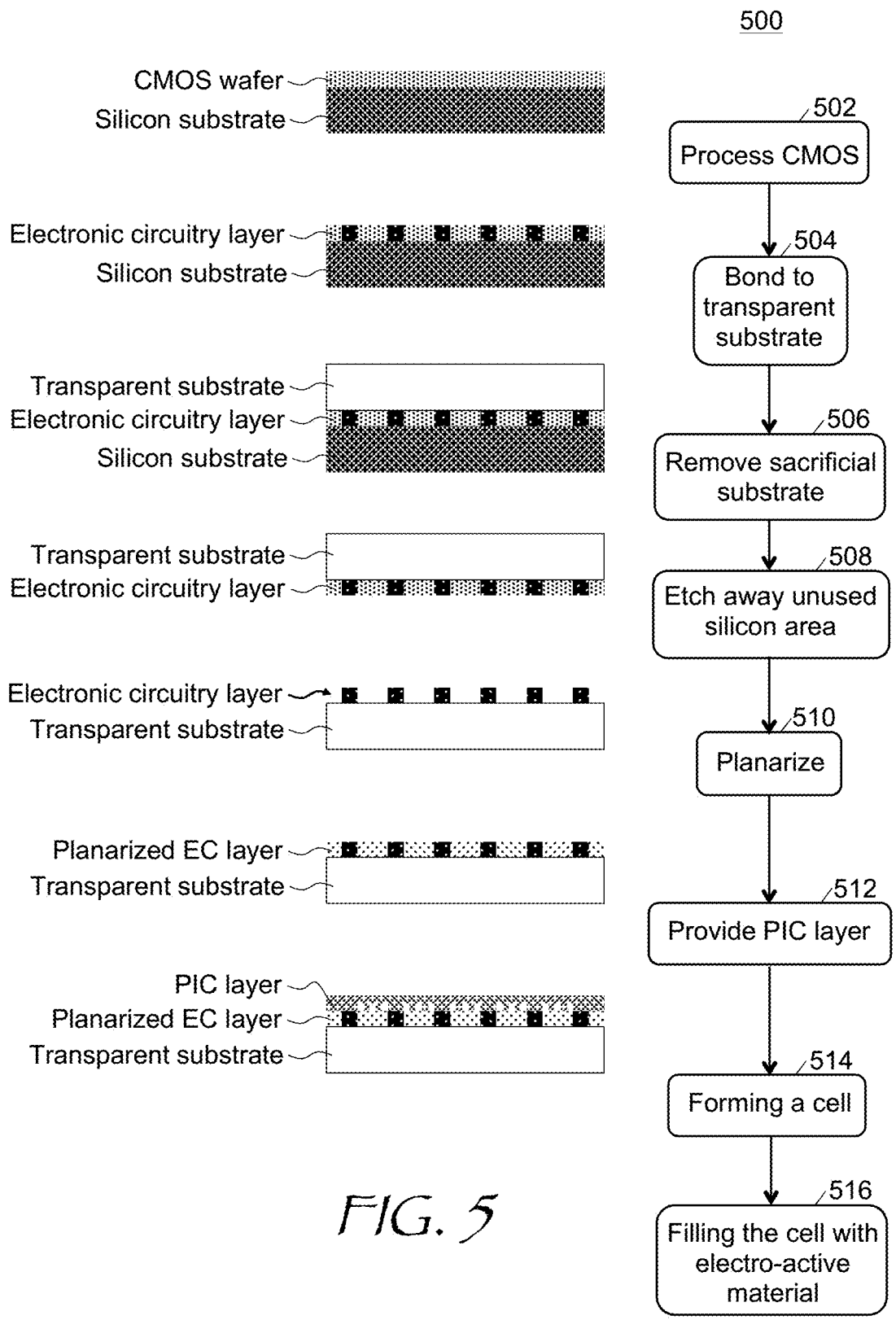
FIG. 5 is a flow chart of a method of manufacture of an electronic circuitry layer on a transparent substrate, and of a self-lit display based thereon.

Turning to FIG. 5, a method 500 of manufacturing a self-lit display panel of this disclosure includes forming (502) an electronic circuitry layer on a sacrificial substrate, for example forming a CMOS electronic circuitry layer on a silicon substrate. The electronic circuitry layer may include pixel controlling gates, connections, vias, pixelated electrode layer including an array of pixel electrodes, etc., as needed for the intended display operation. The formed electronic circuitry layer is bonded (504) to a first substrate, e.g. a glass or sapphire transparent substrate, from the opposite side of the electronic circuitry layer. The sacrificial substrate is then removed (506) e.g. by etching.

Opaque material from under pixelated electrodes may be cleared (508), and the resulting structure may be backfilled or planarized (510) to form transparent areas such as, for example, the areas 202 under pixel electrodes of the self-lit display panel 200 of FIG. 2, the self-lit display panel 300 of FIG. 3, or the self-lit display panel 400 of FIG. 4. A PIC layer may be then provided (512). The PIC layer may be disposed on the planarized electronic circuitry layer ("EC layer" in FIG. 5) as in, for example, the self-lit display panel 300 of FIG. 3. The electronic circuitry layer may be placed on another substrate of the cell, as in, for example, the self-lit display panel 400 of FIG. 4. The formed PIC layer may include an array of waveguides for guiding illuminating light, and an array of out-couplers coupled to the array of waveguides for out-coupling portions of the illuminating light, as explained above with reference to FIGS. 1-4. A cell may be then formed (514), by providing a second substrate in a fixed-apart relationship with the first substrate, the second substrate supporting a backplane electrode layer. The cell is defined by the electrodes facing into the cell as in the display panels of FIGS. 1-4. The cell may then be filled (516) with an electro-active material such as, for example, a nematic or ferroelectric LC fluid.

In some embodiments, for example in the self-lit display panel 200 of FIG. 2 and in the self-lit display panel 300 of FIG. 3, the PIC layer is formed on the first substrate, facing the cell when the cell is formed. In such embodiments, the electronic circuitry layer may be disposed between the PIC layer and the electro-active material. In some embodiments, the PIC layer may be formed on the second substrate facing the cell when the cell is formed as in, for example, the self-lit display panel 400 of FIG. 4.

The self-lit property afforded by a PIC structure with waveguides and out-coupler arrays enables directing chief rays of the individual out-coupled illuminating light portions to pre-defined locations, e.g. to a location of a collimating element such as a collimator lens, so-called chief ray engineering. Herein, the term "chief ray" refers to a ray carrying the most of the emitted light energy as compared to other rays in a ray fan representing a light beam. It is noted that the term "chief ray" as defined herein does not necessarily propagate through a center of an optical system.

Figures 6A, 6B:
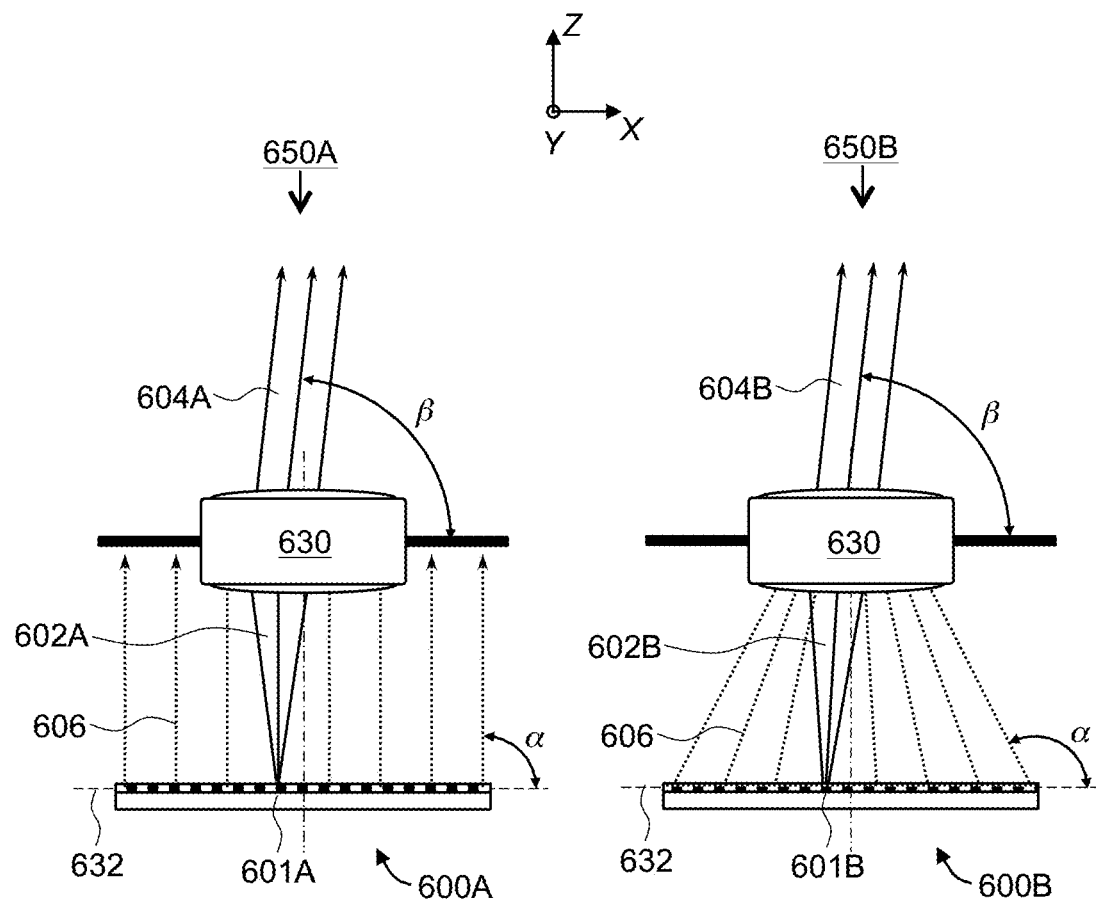
FIGS. 6A and 6B are schematic views of near-eye displays based on a self-lit display panel of FIGS. 1A, 1B, and FIGS. 2-4 without (FIG. 6A) and with (FIG. 6B) chief ray engineering.

Referring for a non-limiting illustrative example to FIG. 6A, a display apparatus 650A, shown in a partial view, includes a self-lit display panel 600A optically coupled to a collimator 630. The self-lit display panel 600A includes an array of pixels defined by respective pixel electrodes, as described above with reference to the self-lit displays 100, 200, 300, 400 of FIGS. 1A, 2, 3, and 4, respectively. Each pixel emits a light cone to be collimated by the common collimator 630 into a collimated light beam. The collimator 630 is disposed one focal length away from the self-lit display panel 600A. In other words, the self-lit display panel 600A is disposed in a focal plane 632 of the collimator 630. The angle of a collimated beam w.r.t. X-axis depends on the x-coordinate of the emitting pixel. For example, a pixel 601A of the self-lit display panel 600A emits a light cone, or a diverging light beam 602A which is collimated by the collimator 630 into a collimated beam 604A at an angle β w.r.t. X-axis.

Each pixel of the self-lit display panel 600A emits a light cone with a chief ray perpendicular to the plane of the self-lit display panel 600A or XY-plane, i.e. with an angle α between the chief ray and the XY plane equal to 90 degrees. In other words, most light energy emitted by the pixels propagates along Z-axis as indicated with dashed lines 606. One can see that outer rays (two outer rays on each side of the collimator 630) get clipped and do not propagate through the collimator 630 because in this example, the collimator 630 is smaller than the self-lit display panel 600A. This will result in vignetting of the image displayed by the self-lit display panel 600A.

Turning now to FIG. 6B, a display apparatus 650B includes a self-lit display panel 600B optically coupled to the collimator 630. The self-lit display panel 600B includes an array of pixels defined by respective pixel electrodes, as described above with reference to the self-lit displays 100, 200, 300, 400 of FIGS. 1A, 2, 3, and 4, respectively. Each pixel emits a light cone to be collimated by the common collimator 630 disposed one focal length away from the self-lit display panel 600B. The angle of the collimated beam w.r.t. X-axis depends on the x-coordinate of the pixel. For example, a pixel 601B of the self-lit display panel 600B emits a light cone, or a diverging light beam 602B which is collimated by the collimator 630 into a collimated beam 604B at the angle β w.r.t. X-axis. The chief ray angle of the diverging light beams emitted by different pixels of the self-lit display panel 600B depend on X-coordinate, to direct the chief rays towards the collimator 630. For example, the diverging light beam 602B is tilted and not straight as in FIG. 6A. This enables one to avoid, or significantly reduce, the vignetting of the image displayed by the self-lit display panel 600B. It is further noted that the angle β of the collimated beam 604B does not, in a first approximation, get impacted by the tilting angle α of the chief ray because the angle β only depends on the pixel coordinate. The desired directing of chief rays of the light beams emitted by the pixels of the self-lit display panel 600B may be achieved by configuring the array of out-couplers 111 (FIGS. 1A, 2, 3, and 4) coupled to the array of waveguides 109 for out-coupling the portions 110A of the illuminating light 110 through the array of pixel electrodes 107 at a chief ray angle spatially varying from one pixel electrode 107 to another, e.g. to pass all rays through the collimator. It is further noted that the out-couplers 111 may also be configured to control the cone angle of the diverging light beams 602B of the out-coupled illuminating light portions, i.e. the angular width of the emitted light cone 602B.

Figure 7A:
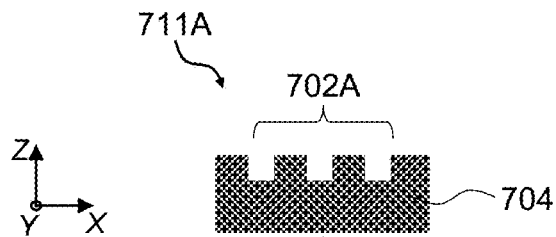
FIGS. 7A to 7D are side cross-sectional views of various embodiments of grating out-couplers of a photonic integrated circuit of a self-lit display panel of this disclosure.

Non-limiting examples of the out-couplers 111 for any of the self-lit display panels of this disclosure will now be presented. The configurations may be used for chief ray engineering, and may be optimized for uniform illumination, exit pupil control, etc. Referring first to FIG. 7A, an out-coupler 711A includes a grating structure 702A etched in a core 704 of a ridge-type waveguide of the PIC layer. A period or pitch of the grating structure 702A may be selected to out-couple portions of the illuminating light towards the electroactive layer at a desired out-coupling angle. The etching depth of the grating structure 702A may be spatially varied to provide a spatially varying out-coupling efficiency.

Figure 7B:
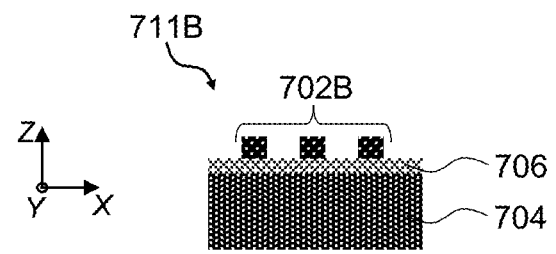

In FIG. 7B, an out-coupler 711B includes a grating structure 702B supported by a spacer layer 706 supported by the core 704 of the ridge-type waveguide. A period or pitch of the grating structure 702B may be selected to out-couple portions of the illuminating light towards the electroactive layer at a desired out-coupling angle. A thickness of the spacer layer 706 may be spatially varied to provide a spatially varying out-coupling efficiency.

Figure 7C:
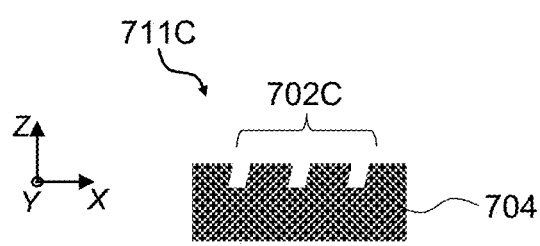

Referring now to FIG. 7C, an out-coupler 711C is similar to the out-coupler 711A of FIG. 7A. The out-coupler 711C of FIG. 7C includes a slanted grating structure 702C etched in the core 704 of a ridge-type waveguide of the PIC layer. Slanting of the grating structure 702C enables one to change (increase or decrease) the amount of light energy going into a selected diffraction order.

Figure 7D:
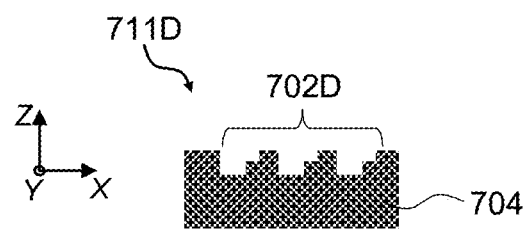

Turning to FIG. 7D, an out-coupler 711D is similar to the out-coupler 711C of FIG. 7C. The out-coupler 711D of FIG. 7D includes a binary slanted grating structure 702D etched in the core 704 of a ridge-type waveguide of the PIC layer. The binary slanted grating structure 702D may be obtained by a sequence of straight etching steps. In FIGS. 7A to 7D, the grating structures 702A-702D may be provided on top and/or bottom of the respective ridge waveguides. The pitches of the grating structures 702A-702D may be chirped to control the cone angle, i.e. the angular spread of the out-coupled illuminating light portions.

Figure 8A:
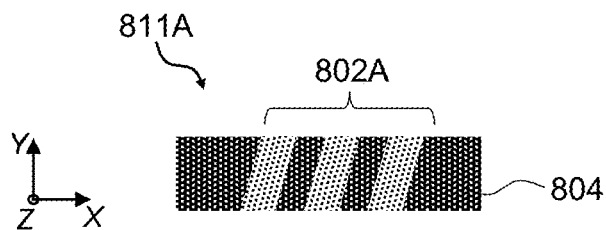
FIG. 8A is a top view of a slanted grating embodiment of out-couplers of a photonic integrated circuit of a self-lit display panel of this disclosure.

Referring now to FIG. 8A, an out-coupler 811A is similar to the out-coupler 711A of FIG. 7A, and includes similar elements. A grating structure 802A etched in a core 804 of a ridge-type waveguide of the PIC layer is slanted in the plane of the PIC layer, i.e. in XY plane, to redirect the chief ray of the corresponding out-coupled illuminating light portion in a direction perpendicular to the core 804, e.g. towards a collimator to reduce vignetting and to improve light utilization efficiency as has been explained above with reference to FIGS. 6A and 6B. More generally, the etched grating structure may be slanted in two planes, i.e. in plane of FIG. 7C (XZ plane) which is perpendicular to the PIC layer plane (XY plane), and in plane of FIG. 8A (XY plane), to redirect the chief ray in two orthogonal directions. The etched grating structure 802A may also be chirped for cone angle control.

Figure 8B:
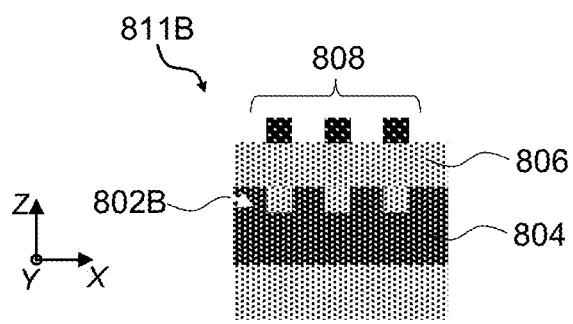
FIG. 8B is a side cross-sectional view of a grating out-coupler with a nanostructure-based chief ray angle control, usable in the photonic integrated circuit of a self-lit display panel of this disclosure.

Referring to FIG. 8B, an out-coupler 811B includes a grating 802B etched in the ridge-type waveguide 804, an optional spacer layer 806 supported by the grating 802B, and an array of nanostructures 808 supported by the spacer layer 806. The array of nanostructures 808 may be configured to provide the required chief ray angle, the light cone width, etc.

Figure 8C:
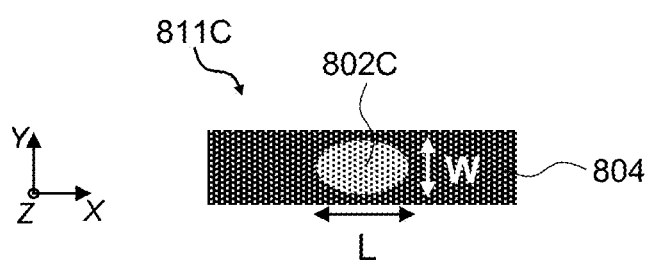
FIG. 8C is a top view of a nanoantenna embodiment of out-couplers of a photonic integrated circuit of the self-lit display panel of a self-lit display panel of this disclosure.

Turning to FIG. 8C, an out-coupler 811C includes a nanoantenna 802C shaped and sized to provide a required angular cone width and chief ray angle of an illuminating light portion out-coupled from the core 804 of the ridge-type waveguide. Length L and width W of the nanoantenna 802C, and the material of the nanoantenna 802B may be selected to provide the required out-coupling strength and angular characteristics e.g. due to electromagnetic resonance of the nanoantenna 802C defined by its geometry and material. The nanoantenna 802B can be dielectric or metallic (plasmonic). The length L and width W are typically less than one micrometer. An array of the nanoantennae 802C may be provided, with rows of the array coupled to individual ridge waveguides. Furthermore, in all examples of the out-couplers of FIGS. 7A to 7D and 8A to 8C, the relevant parameters of the out-couplers may be spatially varied to provide the spatially varying chief ray angle as was explained above with reference to FIGS. 6A and 6B.

Figure 9A:
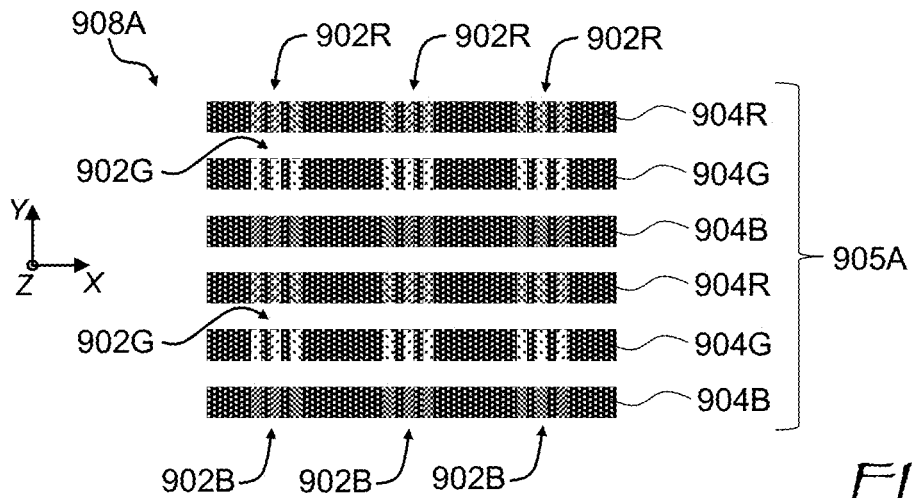
FIGS. 9A to 9C are schematic views of color illumination configurations for a self-lit display panel of this disclosure.

Exemplary color illumination configurations for PIC layers in self-lit display panels of this disclosure will now be described. FIG. 9A is a top view of a PIC layer 908A, which is a variant of the PIC layer 108 of any of the self-lit display panels 100, 200, 300, and 400 of FIGS. 1A, 2, 3, and 4, respectively. The PIC layer 908A of FIG. 9A includes an array of waveguides 905A including a plurality of sub-arrays, each sub-array being configured to carry a particular color channel of a plurality of color channels of illuminating light. Specifically in this example, the array of waveguides 905A includes a red waveguide sub-array 904R for conveying illuminating light of a red color channel, a green waveguide sub-array 904G for conveying illuminating light of a green color channel, and a blue waveguide sub-array 904B for conveying illuminating light of a blue color channel. The red 904R, green 904G, and blue 904B sub-arrays are interleaved and run parallel to one another in a common plane (i.e. XY plane), as shown in FIG. 9A. Waveguides of the red waveguide sub-array 904R include a plurality of grating out-couplers 902R for out-coupling portions of the illuminating light; waveguides of the green waveguide sub-array 904G include a plurality of grating out-couplers 902G for out-coupling portions of green illuminating light; and waveguides of the blue waveguide sub-array 904B include a plurality of grating out-couplers 902B for out-coupling portions of the blue illuminating light.

Figure 9B:
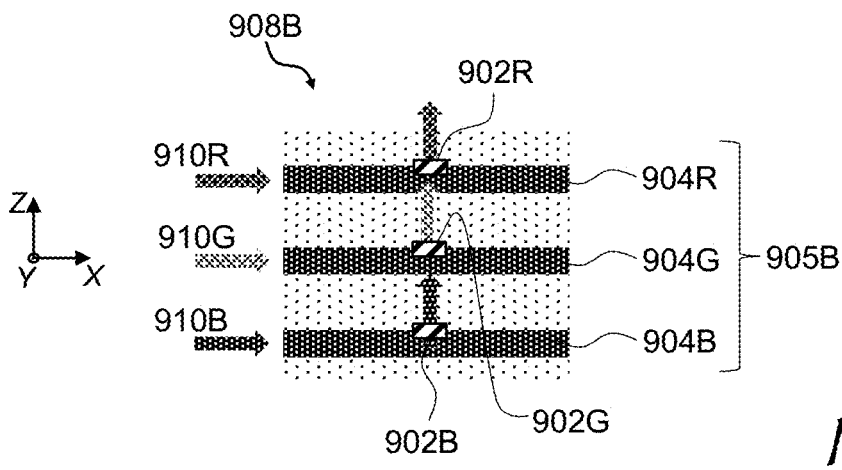

Referring to FIG. 9B, a PIC layer 908B is a variant of the PIC layer 108 of any of the self-lit display panels 100, 200, 300, and 400 of FIGS. 1A, 2, 3, and 4, respectively. The PIC layer 908B of FIG. 9B includes an array of waveguides 905B having a plurality of sub-arrays, each sub-array being configured to carry a particular color channel of a plurality of color channels of illuminating light. Specifically in this example, the array of waveguides 905B includes a red waveguide sub-array 904R for conveying illuminating light of a red color channel, a green waveguide sub-array 904G for conveying illuminating light of a green color channel, and a blue waveguide sub-array 904B for conveying illuminating light of a blue color channel. Waveguides of the red 904R, green 904G, and blue 904B sub-arrays run one under another at different z-depths in the PIC layer 908B, as shown. Waveguides of the 904R, green 904G, and blue 904B sub-arrays include a plurality of grating out-couplers 902R, 902G, and 902B for out-coupling portions of red 910R, green 910G, and blue 910B illuminating light, respectively. The grating out-couplers 902R, 902G, and 902B illuminating a same pixel are disposed one under another, as shown.

Figure 9C:
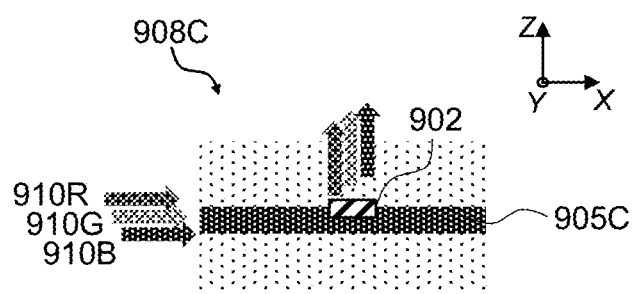

Turning to FIG. 9C, a PIC layer 908C is a variant of the PIC layer 108 of any of the self-lit display panels 100, 200, 300, and 400 of FIGS. 1A, 2, 3, and 4, respectively. The PIC layer 908C of FIG. 9C includes an array of waveguides 905C, each waveguide 905C including an array of color non-selective out-couplers 902. Each color non-selective out-coupler 902 is configured to out-couple each color channel of the plurality of color channels (i.e. the red 910R, green 910G, and blue 910B illuminating light) at a substantially same chief ray angle. Examples of color non-selective out-couplers are given e.g. in U.S. Pat. No. 10,877,214 B2 to Shipton et al., which is incorporated herein by reference in its entirety.

Figure 10:
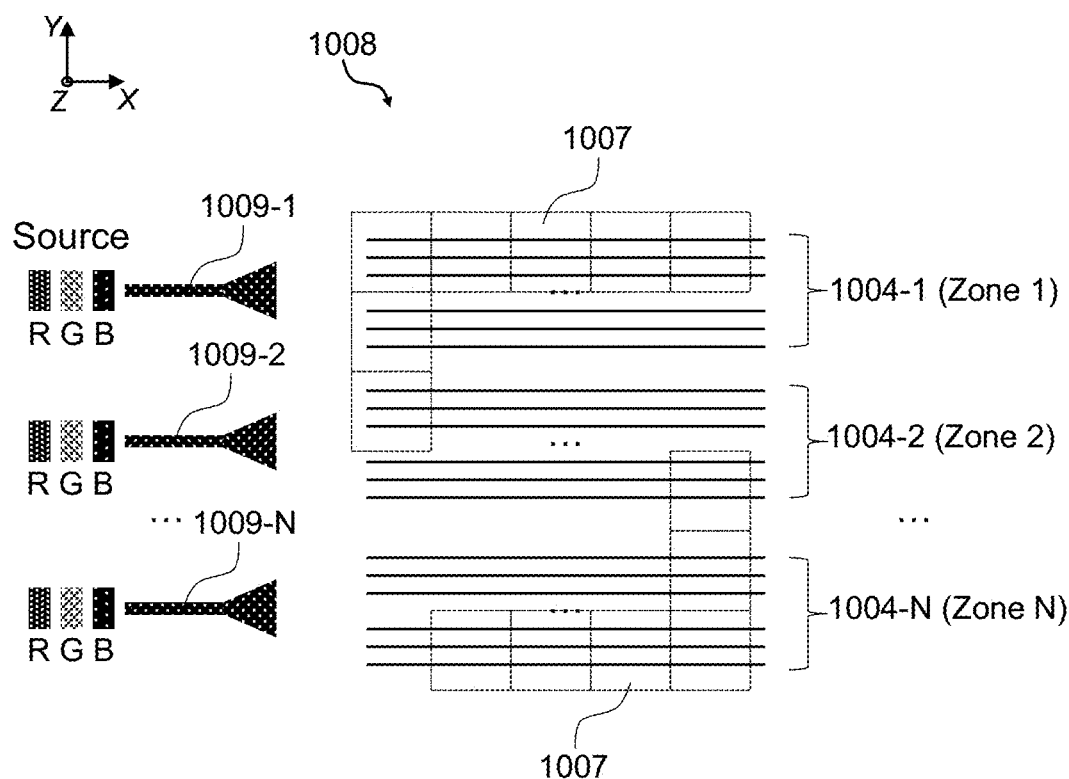
FIG. 10 is a top schematic view of a photonic integrated circuit configured for zonal illumination of a display panel of this disclosure.

Referring to FIG. 10, a PIC layer 1008 is a variant of the PIC layer 108 of any of the self-lit display panels 100, 200, 300, and 400 of FIGS. 1A, 2, 3, and 4, respectively. The PIC layer 1008 of FIG. 10 comprises an array of waveguides including a plurality of sub-arrays 1004-1, 1004-2, . . . , 1004-N, each sub-array coupled to a beamsplitter 1009-1, 1009-2, . . . , 1009-N for illuminating a particular geometrical area of the array of pixel electrodes 1007. Each sub-array may include red, green, and blue waveguides (i.e. waveguides configured for guiding red (R), green (G), and blue (B) illuminating light) for guiding light of individual color channels. Such a configuration provides a self-lit display panel with a possibility of zonal illumination, i.e. with a possibility of reducing or even switching off illuminating light under dark areas of the image being displayed, thus achieving overall energy savings for images where only a portion of the image is bright, and improving overall perceived image contrast.

In some embodiments, each zone is illuminated by a dedicated laser source or a set of laser sources, or more generally semiconductor light sources, as illustrated in FIG. 10. In some embodiments, a single light source per color channel may be used, e.g. a light source for R color channel, a light source for G color channel, and a light source for B color channel. The light source of each of R, G, and B color channel may be coupled to dedicated on-chip active PIC element(s) such as optical switches or variable optical splitters for example, that redistribute light energy between different zones depending on the image content.

Figure 11:
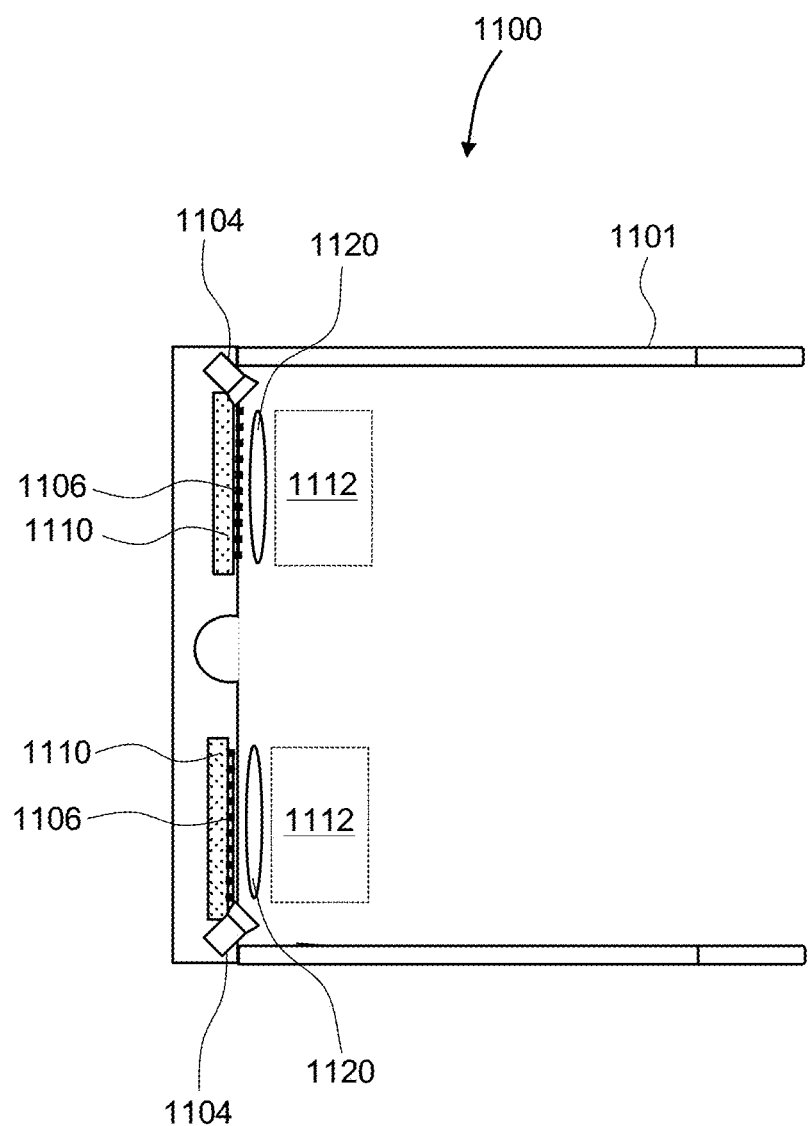
FIG. 11 is a view of near-eye display of this disclosure having a form factor of a pair of eyeglasses.

Referring to FIG. 11, a virtual reality (VR) near-eye display 1100 includes a frame 1101 supporting, for each eye: a self-lit display panel 1110 such as any of the self-lit display panels disclosed herein; and an ocular lens or collimator 1120 for converting the image in linear domain generated by the display panel 1110 into an image in angular domain for direct observation at an eyebox 1112. A plurality of eyebox illuminators 1106, shown as black dots, may be placed around the display panel 1110 on a surface that faces the eyebox 1112. An eye-tracking camera 1104 may be provided for each eyebox 1112.

The purpose of the eye-tracking cameras 1104 is to determine position and/or orientation of both eyes of the user. The eyebox illuminators 1106 illuminate the eyes at the corresponding eyeboxes 1112, allowing the eye-tracking cameras 1104 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with the light of the eyebox illuminators 1106, the latter may be made to emit light invisible to the user. For example, infrared light may be used to illuminate the eyeboxes 1112.

Figure 12:
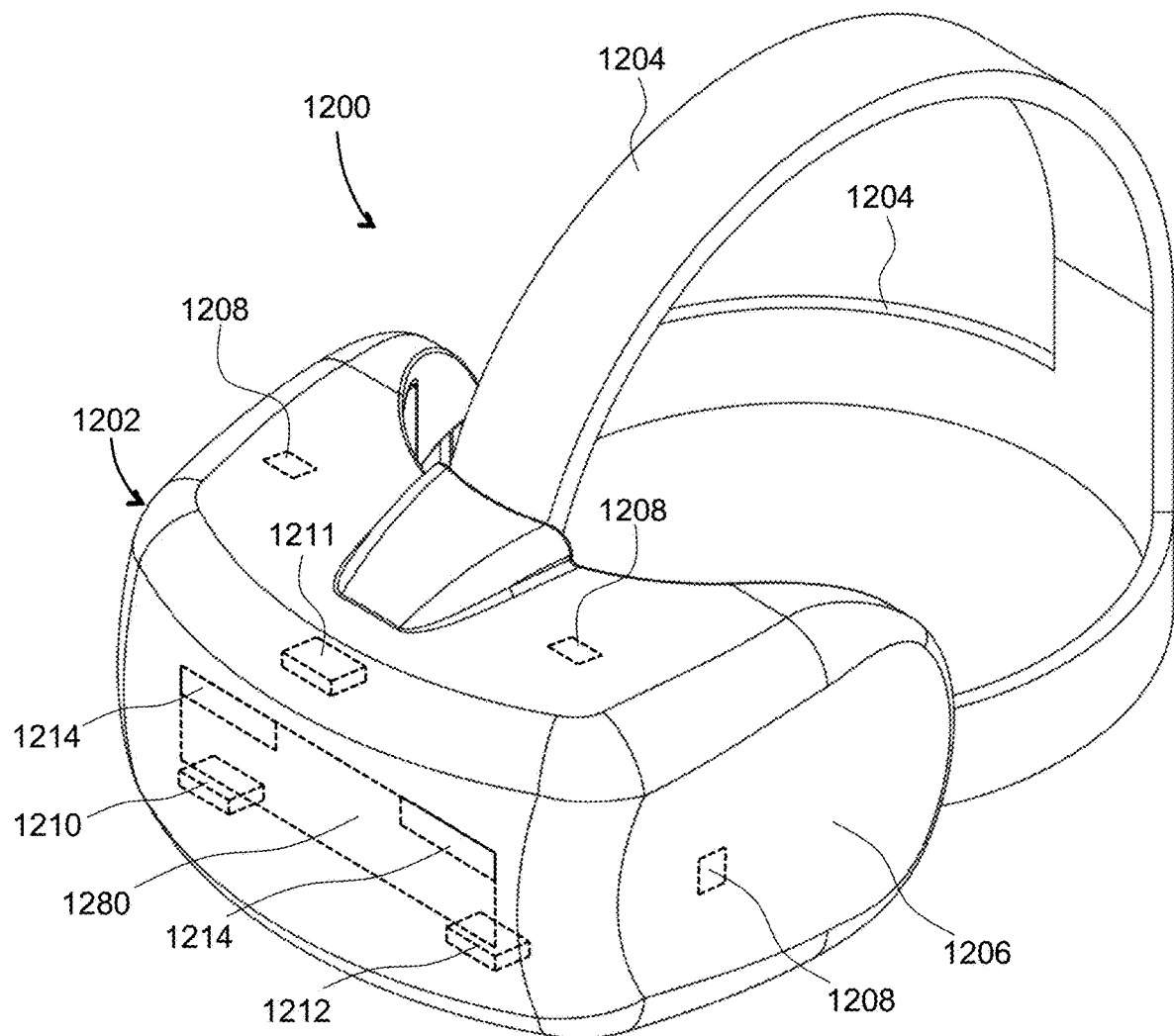
FIG. 12 is a three-dimensional view of a head-mounted display (HMD) of this disclosure.

Turning to FIG. 12, an HMD 1200 is an example of an AR/VR wearable display system which encloses the user's face, for a greater degree of immersion into the AR/VR environment. The HMD 1200 may generate the entirely virtual 3D imagery. The HMD 1200 may include a front body 1202 and a band 1204 that can be secured around the user's head. The front body 1202 is configured for placement in front of eyes of a user in a reliable and comfortable manner. A display system 1280 may be disposed in the front body 1202 for presenting AR/VR imagery to the user. The display system 1280 may include any of the self-lit display panels disclosed herein. Sides 1206 of the front body 1202 may be opaque or transparent.

In some embodiments, the front body 1202 includes locators 1208 and an inertial measurement unit (IMU) 1210 for tracking acceleration of the HMD 1200, and position sensors 1212 for tracking position of the HMD 1200. The IMU 1210 is an electronic device that generates data indicating a position of the HMD 1200 based on measurement signals received from one or more of position sensors 1212, which generate one or more measurement signals in response to motion of the HMD 1200. Examples of position sensors 1212 include: one or more accelerometers, one or more gyroscopes, one or more magnetometers, another suitable type of sensor that detects motion, a type of sensor used for error correction of the IMU 1210, or some combination thereof. The position sensors 1212 may be located external to the IMU 1210, internal to the IMU 1210, or some combination thereof.

The locators 1208 are traced by an external imaging device of a virtual reality system, such that the virtual reality system can track the location and orientation of the entire HMD 1200. Information generated by the IMU 1210 and the position sensors 1212 may be compared with the position and orientation obtained by tracking the locators 1208, for improved tracking accuracy of position and orientation of the HMD 1200. Accurate position and orientation is important for presenting appropriate virtual scenery to the user as the latter moves and turns in 3D space.

The HMD 1200 may further include a depth camera assembly (DCA) 1211, which captures data describing depth information of a local area surrounding some or all of the HMD 1200. The depth information may be compared with the information from the IMU 1210, for better accuracy of determination of position and orientation of the HMD 1200 in 3D space.

The HMD 1200 may further include an eye tracking system 1214 for determining orientation and position of user's eyes in real time. The obtained position and orientation of the eyes also allows the HMD 1200 to determine the gaze direction of the user and to adjust the image generated by the display system 1280 accordingly. The determined gaze direction and vergence angle may be used to adjust the display system 1280 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1202.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A self-lit display panel comprising:
a first substrate;
a photonic integrated circuit (PIC) layer supported by the first substrate, the PIC layer comprising an array of waveguides for guiding illuminating light;
an electronic circuitry layer supported by the PIC layer; and
a pixelated electrode layer comprising an array of pixel electrodes, wherein the electronic circuitry layer is configured for applying electrical signals to the array of pixel electrodes;
wherein the PIC layer comprises an array of out-couplers coupled to the array of waveguides for out-coupling portions of the illuminating light through the electronic circuitry layer and through the array of pixel electrodes.

2. The self-lit display panel of claim 1, further comprising:
a second substrate opposite the first substrate;
a backplane electrode layer supported by the second substrate, the pixelated and backplane electrode layers defining a cell; and
an electroactive layer in the cell;
wherein in operation, the illuminating light portions propagate in sequence through the electronic circuitry layer, the pixel electrodes, the electroactive layer, the backplane electrode, and the second substrate.

3. The self-lit display panel of claim 2, wherein the electroactive layer comprises liquid crystals.

4. The self-lit display panel of claim 1, wherein the array of out-couplers comprises gratings formed in the array of waveguides.

5. The self-lit display panel of claim 4, wherein the gratings are slanted to provide a chief ray angle of the portions of the illuminating light spatially varying from one pixel electrode to another.

6. The self-lit display panel of claim 1, wherein the array of out-couplers comprises an array of nanostructures to provide a chief ray angle of the portions of the illuminating light spatially varying from one pixel electrode to another.

7. The self-lit display panel of claim 1, wherein:
the illuminating light comprises a plurality of color channels;
each waveguide of the array of waveguides is configured to convey each color channel of the plurality of color channels; and
each out-coupler of the array of out-couplers is configured to out-couple each color channel of the plurality of color channels at a substantially same chief ray angle.

8. The self-lit display panel of claim 7, wherein the array of waveguides comprises a plurality of sub-arrays, wherein each sub-array is configured to carry a particular color channel of the plurality of color channels of the illuminating light.

9. A self-lit display panel comprising:
first and second opposed substrates;
a photonic integrated circuit (PIC) layer supported by the first substrate, the PIC layer comprising an array of waveguides for guiding illuminating light;
a backplane electrode layer supported by the PIC layer;
an electronic circuitry layer supported by the second substrate;
a pixelated electrode layer comprising an array of pixel electrodes, wherein the electronic circuitry layer is configured for applying electrical signals to the array of pixel electrodes, the pixelated and backplane electrode layers defining a cell; and
an electroactive layer in the cell;
wherein the PIC layer comprises an array of out-couplers coupled to the array of waveguides for out-coupling portions of the illuminating light through the backplane electrode layer, the electroactive layer, and the array of pixel electrodes.

10. The self-lit display panel of claim 9, wherein the electroactive layer comprises liquid crystals.

11. The self-lit display panel of claim 9, wherein the array of out-couplers comprises gratings formed in the array of waveguides.

12. The self-lit display panel of claim 11, wherein the gratings are slanted to provide a chief ray angle of the portions of the illuminating light spatially varying from one pixel electrode to another.

13. The self-lit display panel of claim 9, wherein the array of out-couplers comprises an array of nanostructures to provide a chief ray angle of the portions of the illuminating light spatially varying from one pixel electrode to another.

14. The self-lit display panel of claim 9, wherein:
the illuminating light comprises a plurality of color channels;
each waveguide of the array of waveguides is configured to convey each color channel of the plurality of color channels; and
each out-coupler of the array of out-couplers is configured to out-couple each color channel of the plurality of color channels at a substantially same chief ray angle.

15. The self-lit display panel of claim 14, wherein the array of waveguides comprises a plurality of sub-arrays, wherein each sub-array is configured to carry a particular color channel of the plurality of color channels of the illuminating light.

16. The self-lit display panel of claim 9, wherein the array of waveguides comprises a plurality of sub-arrays, each sub-array coupled to a beamsplitter for illuminating a particular geometrical area of the array of pixel electrodes.

\* \* \* \* \*